US012665835B2

(12) United States Patent
Chuang et al.

(10) Patent No.: US 12,665,835 B2
(45) Date of Patent: Jun. 23, 2026

(54) METHOD AND DEVICE FOR DETERMINING ROUTING PATH

(71) Applicant: Moxa Inc., New Taipei City (TW)

(72) Inventors: Ching-Chih Chuang, New Taipei City (TW); Yuan-Yao Shih, New Taipei City (TW); Chung-Kai Hung, New Taipei City (TW); Ai-Chun Pang, New Taipei City (TW); Chung-Wei Lin, New Taipei City (TW)

(73) Assignee: Moxa Inc., New Taipei City (TW)

( * ) Notice: Subject to any disclaimer, the term of this patent is extended or adjusted under 35 U.S.C. 154(b) by 323 days.

(21) Appl. No.: 18/523,837

(22) Filed: Nov. 29, 2023

(65) Prior Publication Data

US 2024/0406093 A1 Dec. 5, 2024

Related U.S. Application Data

(60) Provisional application No. 63/469,554, filed on May 30, 2023.

(30) Foreign Application Priority Data

Nov. 13, 2023 (TW) .................................. 112143660

(51) Int. Cl.
H04L 45/128 (2022.01)
G06N 3/006 (2023.01)
(Continued)

(52) U.S. Cl.
CPC ........... H04L 45/128 (2013.01); G06N 3/006 (2013.01); H04L 45/08 (2013.01); H04L 45/121 (2013.01);
(Continued)

(58) Field of Classification Search
CPC ..... H04L 45/128; H04L 45/08; H04L 45/121; H04L 45/122; H04L 45/14; H04L 45/3065; H04L 45/42; H04L 45/74; G06N 3/006
See application file for complete search history.

(56) References Cited

U.S. PATENT DOCUMENTS

| | | | |
|---|---|---|---|
| 2006/0002291 A1* | 1/2006 | Alicherry | H04L 45/28 370/225 |
| 2010/0183153 A1* | 7/2010 | Cho | H04W 40/02 370/328 |
| 2021/0306901 A1* | 9/2021 | Mannweiler | H04L 12/4633 |

FOREIGN PATENT DOCUMENTS

| | | |
|---|---|---|
| CN | 112565068 A | 3/2021 |
| EP | 3869752 A1 | 8/2021 |

(Continued)

OTHER PUBLICATIONS

Alnajim et al., Incremental Path Selection and Scheduling for Time-Sensitive Networks, IEEE Xplore: Feb. 27, 2020, 6 Pages. (Year: 2020).*

(Continued)

*Primary Examiner* — Michael A Keller
*Assistant Examiner* — Chhian (Amy) Ling
(74) *Attorney, Agent, or Firm* — Winston Hsu

(57) ABSTRACT

A method of determining routing path for a TSN system includes determining a plurality of candidate disjoint path pairs of each of a first plurality of streams according to a network topology; initializing a plurality of final routing path pairs used for the first plurality of streams and a plurality of background streams according to a first plurality of lengths of the first plurality of candidate disjoint path pairs; selecting a plurality of temporary routing path pairs used for the first plurality of streams and the plurality of background streams according to the first plurality of param- (Continued)

eters; updating the first plurality of parameters according to the plurality of temporary routing path pairs; and replacing the plurality of temporary routing path pairs with the plurality of final routing path pairs in response to the plurality of temporary routing path pairs being better than the plurality of final routing path pairs.

35 Claims, 4 Drawing Sheets

(51) Int. Cl.

| | | |
|---|---|---|
| *H04L 45/00* | (2022.01) | |
| *H04L 45/02* | (2022.01) | |
| *H04L 45/121* | (2022.01) | |
| *H04L 45/122* | (2022.01) | |
| *H04L 45/302* | (2022.01) | |
| *H04L 45/42* | (2022.01) | |
| *H04L 45/74* | (2022.01) | |

(52) U.S. Cl.
CPC ............ *H04L 45/122* (2013.01); *H04L 45/14* (2013.01); *H04L 45/3065* (2013.01); *H04L 45/42* (2013.01); *H04L 45/74* (2013.01)

(56) References Cited

FOREIGN PATENT DOCUMENTS

| | | |
|---|---|---|
| JP | 2008-54211 A | 3/2008 |
| JP | 2022-32955 A | 2/2022 |
| TW | I801812 B | 5/2023 |

OTHER PUBLICATIONS

Roberto Grossi, Andrea Marino, Luca Versari "Efficient Algorithms for Listing k Disjoint st-Paths in Graphs" Università di Pisa, Italy Dec. 23, 2018, [https://inria.hal.science/hal-01964712/file/paper.pdf], coverpages & pp. 1-13, Dec. 23, 2018.
Roberto P Grossi, Andrea Marino, Luca P Versari, Efficient Algorithms for Listing k Disjoint st-Paths in Graphs, Latin 2018—13th Latin American Symposium on Theoretical Informatics, Apr. 2018, p. 544-557, Springer International Publishing, Buenos Aires, Argentina.
Ayman A. Atallah et al., Fault-Resilient Topology Planning and Traffic Configuration for IEEE 802.1Qbv TSN Networks, 24th International Symposium on On-Line Testing and Robust System Design (IOLTS 2018), 2018, pp. 151-156, IEEE, XP033409860 ,2018.
Ching-Chih Chuang et al., Online Stream-Aware Routing for TSN-Based Industrial Control Systems, 2020, pp. 254-261, IEEE, XP033835633 ,2020.

\* cited by examiner

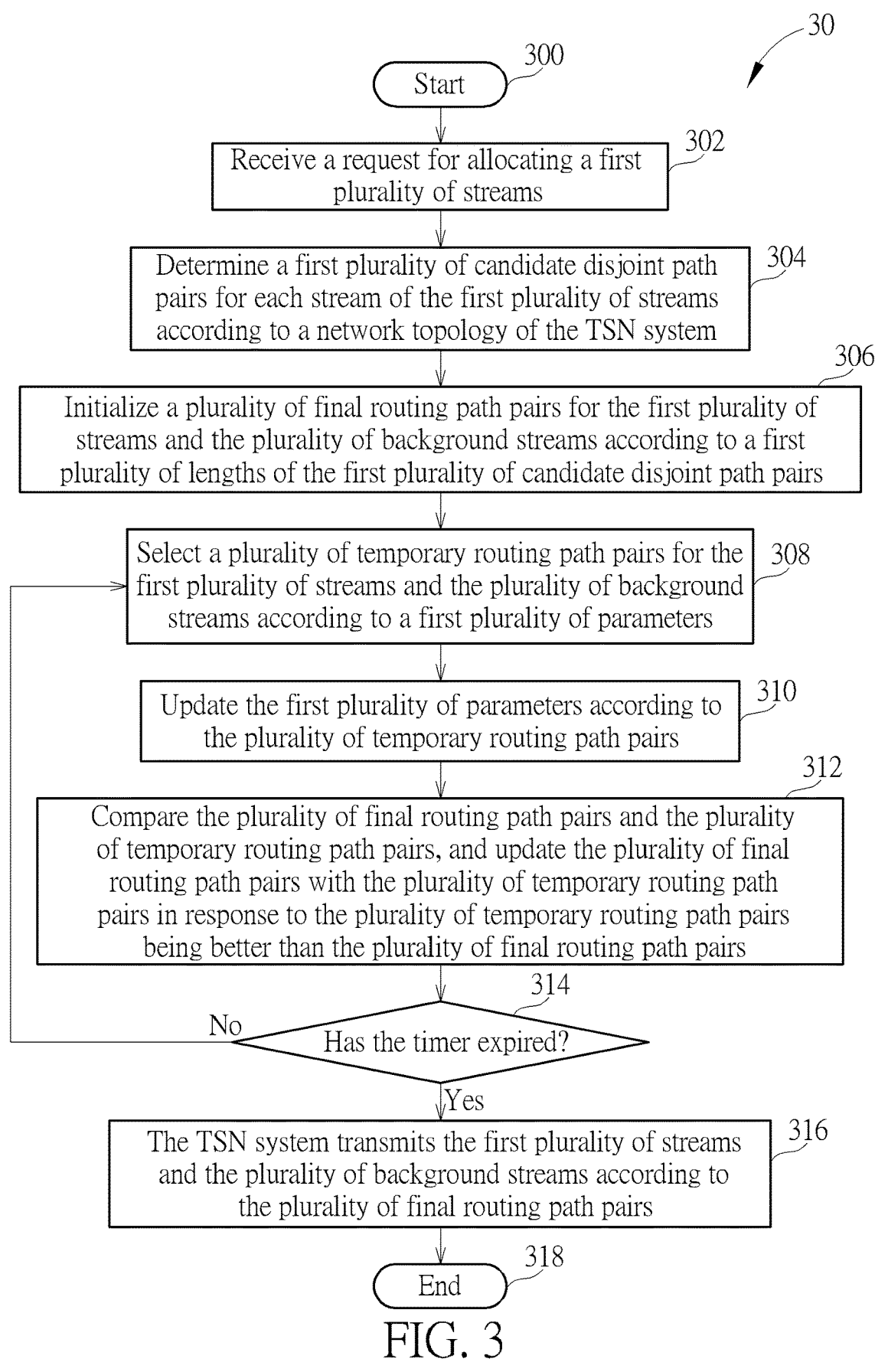

30

Start 300

Receive a request for allocating a first plurality of streams 302

Determine a first plurality of candidate disjoint path pairs for each stream of the first plurality of streams according to a network topology of the TSN system 304

Initialize a plurality of final routing path pairs for the first plurality of streams and the plurality of background streams according to a first plurality of lengths of the first plurality of candidate disjoint path pairs 306

Select a plurality of temporary routing path pairs for the first plurality of streams and the plurality of background streams according to a first plurality of parameters 308

Update the first plurality of parameters according to the plurality of temporary routing path pairs 310

Compare the plurality of final routing path pairs and the plurality of temporary routing path pairs, and update the plurality of final routing path pairs with the plurality of temporary routing path pairs in response to the plurality of temporary routing path pairs being better than the plurality of final routing path pairs 312

Has the timer expired? 314    No

Yes

The TSN system transmits the first plurality of streams and the plurality of background streams according to the plurality of final routing path pairs 316

End 318

FIG. 3

METHOD AND DEVICE FOR DETERMINING ROUTING PATH

CROSS REFERENCE TO RELATED APPLICATIONS

This application claims the benefit of U.S. Provisional Application No. 63/469,554, filed on May 30, 2023. The content of the application is incorporated herein by reference.

BACKGROUND OF THE INVENTION

1. Field of the Invention

The present invention relates to a method and a network device for determining routing path, and more particularly, to a method and a network device for determining survivable routing path in the time-sensitive networking (TSN) system.

2. Description of the Prior Art

Time-sensitive networking (TSN) is a series of standards defined by the TSN task group of the IEEE 802.1 working group to enable deterministic communication for safety-critical and real-time applications in industrial networks. The time-sensitive networking can support streams of various traffic types; however, determining the routing paths for the streams requires a huge amount of calculation and time cost. Therefore, how to determine the routing paths for the streams and how to optimize the performance of the TSN have been major concerns in the art.

Previous techniques have proposed various methods for determining routing paths in time-sensitive networking; however, most of the previous techniques are related to the routing algorithms in an off-line state. Therefore, the previous techniques are not able to cope with the interoperability required by Industry 4.0 and the dynamic configuration requirements (such as dynamically increasing of data streams) of future industrial automation. In addition, previous technologies generally only consider routing path planning for a single traffic type of stream, such as only for TSN streams or only for Audio video bridging (AVB) streams, and therefore, previous technologies are not able to make the most comprehensive and effective use of time-sensitive networking in this situation.

On the other hand, the TSN task group has also developed a fault-tolerant mechanism called Frame Replication and Elimination for Reliability (FRER), i.e. the IEEE 802.1CB standard. In FRER, the frame of the data stream is replicated at the sending end and transmitted to the receiving end via different paths at the same time, making the transmission of important data more immediate and reliable. The IEEE 802.1CB standard realizes a redundant transmission mechanism in time-sensitive networking; however, the routing paths required for transmitting streams multiply therewith, resulting in increased computational and temporal complexity in routing path planning. Therefore, there is an urgent need for online routing algorithms that can take into account both computational efficiency and various traffic types to solve the problem in the art.

SUMMARY OF THE INVENTION

Therefore, the present invention is to provide a method and a device capable of simultaneously considering data streams with various traffic types and performing survivable routing path planning in a limited time in an online state, so as to improve the shortcomings of the prior arts.

An embodiment of the present invention discloses a network device for a Time-Sensitive Networking (TSN) system, wherein the TSN system includes a plurality of background streams. The network device includes a processing unit and a storage unit. The processing unit is configured to execute a program code. The storage unit is coupled to the processing unit and configured to store the program code to instruct the processing unit to execute a method of determining routing path. The method of determining routing path includes receiving a request for allocating a first plurality of streams; determining a first plurality of candidate disjoint path pairs for each stream of the first plurality of streams according to a network topology of the TSN system; initializing a plurality of final routing path pairs for the first plurality of streams and the plurality of background streams according to a first plurality of lengths of the first plurality of candidate disjoint path pairs; selecting a plurality of temporary routing path pairs for the first plurality of streams and the plurality of background streams according to a first plurality of parameters; updating the first plurality of parameters according to the plurality of temporary routing path pairs; and comparing the plurality of final routing path pairs and the plurality of temporary routing path pairs, and updating the plurality of final routing path pairs with the plurality of temporary routing path pairs in response to the plurality of temporary routing path pairs being better than the plurality of final routing path pairs. Accordingly, the TSN system transmits the first plurality of streams and the plurality of background streams according to the plurality of final routing path pairs.

An embodiment of the present invention further discloses a method of determining routing path for a TSN system, and the TSN system comprises a plurality of background streams. The method includes receiving a request for allocating a first plurality of streams; determining a first plurality of candidate disjoint path pairs for each stream of the first plurality of streams according to a network topology of the TSN system; initializing a plurality of final routing path pairs for the first plurality of streams and the plurality of background streams according to a first plurality of lengths of the first plurality of candidate disjoint path pairs; selecting a plurality of temporary routing path pairs for the first plurality of streams and the plurality of background streams according to a first plurality of parameters; updating the first plurality of parameters according to the plurality of temporary routing path pairs; and comparing the plurality of final routing path pairs and the plurality of temporary routing path pairs, and updating the plurality of final routing path pairs with the plurality of temporary routing path pairs in response to the plurality of temporary routing path pairs being better than the plurality of final routing path pairs. The TSN system transmits the first plurality of streams and the plurality of background streams according to the plurality of final routing path pairs.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 is a schematic diagram of a process according to an embodiment of the present invention.

DETAILED DESCRIPTION

Certain terms are used throughout the description and following claims to refer to particular components. As one skilled in the art will appreciate, hardware manufacturers may refer to a component by different names. This document does not intend to distinguish between components that differ in name but not function. In the following description and in the claims, the terms "include" and "comprise" are utilized in an open-ended fashion, and thus should be interpreted to mean "include, but not limited to". Also, the term "couple" is intended to mean either an indirect or direct electrical connection. Accordingly, if one device is coupled to another device, that connection may be through a direct electrical connection, or through an indirect electrical connection via other devices and connections.

Figure 1:
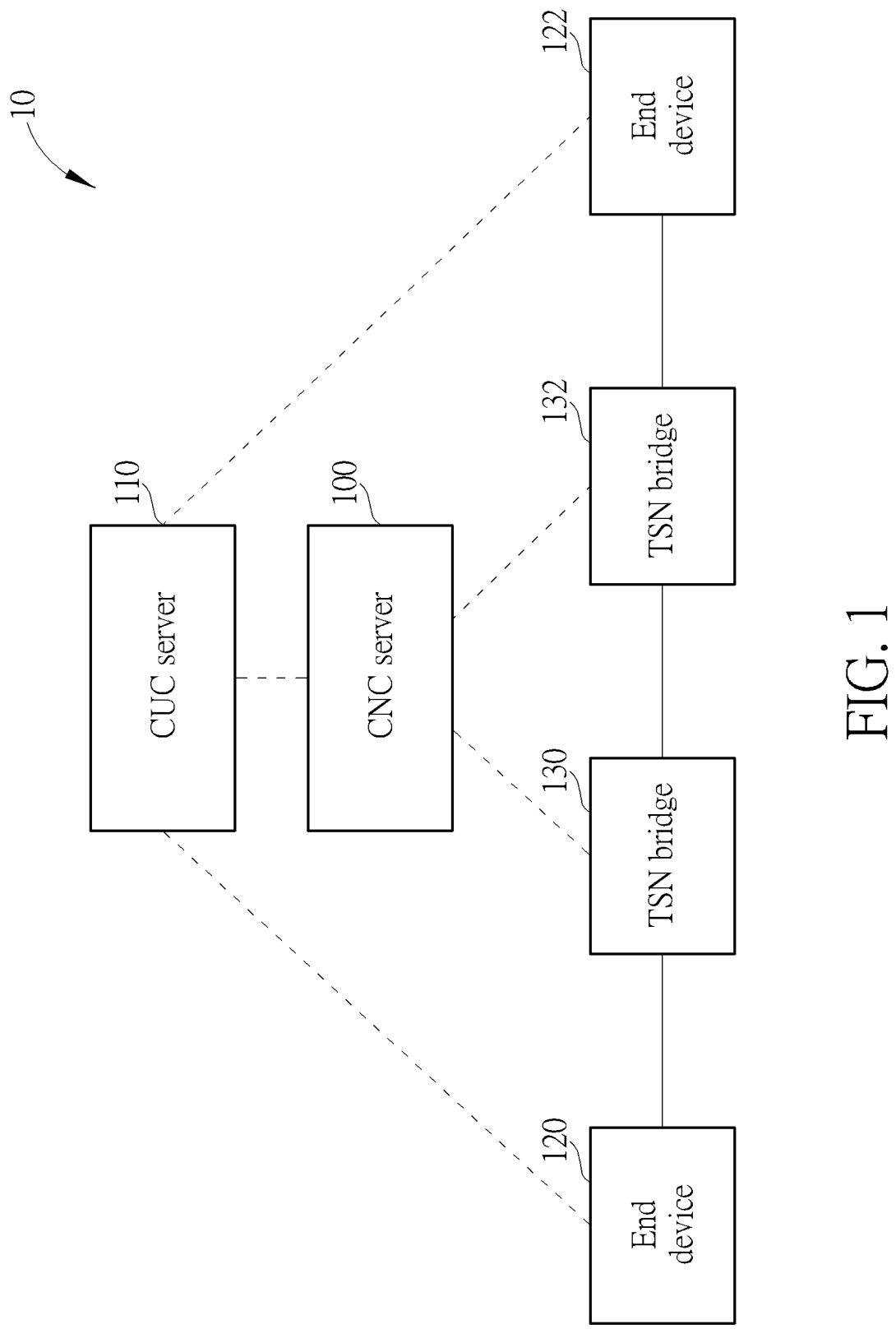
FIG. 1 is a schematic diagram of a TSN system according to an embodiment of the present invention.

Please refer to FIG. 1, which is a schematic diagram of a TSN system 10 according to an embodiment of the present invention. The TSN system 10 operates according to the fully centralized model of TSN, which may be simply composed of a centralized network configuration (CNC) server 100, a centralized user configuration (CUC) server 110, end devices 120, 122, and TSN bridges 130, 132. The end devices 120, 122 and the TSN bridges 130, 132 are connected by physical links, and the end devices 120 and 122 may execute time-aware applications that require deterministic communication.

In FIG. 1, the CNC server 100, the CUC server 110, the end devices 120, 122 and the TSN bridges 130, 132 are merely used to illustrate the architecture of the TSN system 10. In practical, the end devices 120 and 122 may be and not limited to the devices such as robots, sensors, machines, or programmable logic controllers (PLC), and may perform end-to-end communications with other end devices. In other words, the end stations 120 and 122 may be a source node (talker) or a destination node (listener) of a stream defined by a plurality of TSN parameters. It should be noted that the end stations 120 and 122 may be listeners of one stream while being talkers of another stream, and the different quality of service (QoS) requirements of the different streams in TSN should be met in the end-to-end communication. In general, the various QoS requirements of streams may be stored in the end stations 120 and 122 as bases for scheduling and routing of the streams.

The CUC server 110 may communicate with the CNC server 100 and the end devices 120, 122 to obtain the QoS requirements of the streams from the end devices 120 and 122 and thereby ask the CNC server 100 for the scheduling and routing configuration, and then return the configuration results of the steam to the end devices 120 and 122.

The CNC server 100 is a network device that calculates the network routing and scheduling and configures network resources. The CNC server 100 may communicate with the CUC server 110 and the TSN bridges 130, 132 to obtain the QoS requirements of the streams from the CUC server 110 and configure the TSN bridges 130 and 132. In other words, the CNC server 100 performs stream scheduling and routing calculation according to the QoS requirement and network topology obtained from the CUC server 110 and then applies the calculation results to the TSN bridges 130 and 132 to configure the end-to-end communications of the steams.

The TSN bridges 130 and 132 may be Ethernet switches that may receive network configuration from the CNC server 100 and identify the traffic class of the stream. According to the gate control list (GCL) determined by the CNC server 100, the TSN bridges 130 and 132 forward streams from one end device to another, realizing the deterministic communication in the TSN system 10.

According to specifications of TSN, the traffic of the streams may be TSN streams, audio video bridging (AVB) streams, and best effort (BE) streams in order of priority from high to low. In other words, frames of the TSN stream may be prioritized in the TSN system 10 by preempting frames of the AVB stream and frames of the BE stream. In the embodiment of the present invention, the TSN system 10 may support routing path determination for the TSN streams as well as the AVB streams.

A TSN stream $\lambda_k$ may be defined according to a plurality of parameters, e.g., a source node (talker) $I_k$, a destination node (listener) $J_k$, a size $S_k$, a period $P_k$, an offset $F_k$, and a deadline $D_k$. In other words, data (e.g., an Ethernet frame) with the size $S_k$ needs to be transmitted periodically from the source node $I_k$ to the destination node $J_k$ at the time points $\{F_k, F_k+P_k, F_k+^2P_k, \ldots \}$ and required to arrive at the destination node $J_k$ within $D_k$ time unit.

An AVB stream $\lambda_k$ may be defined according to a plurality of parameters, e.g., a source node (talker) $I_k$, a destination node (listener) $J_k$, a size $S_k$, a period $P_k$, a type (e.g., high priority class-A or low priority class-B) $T_k$, and a deadline $D_k$. In other words, data with the size $S_k$ and the type $T_k$ needs to be transmitted periodically from the source node $I_k$ to the destination node $J_k$ in every $P_k$ time unit and may need to arrive at the destination node $J_k$ within $D_k$ time unit.

Figure 2:
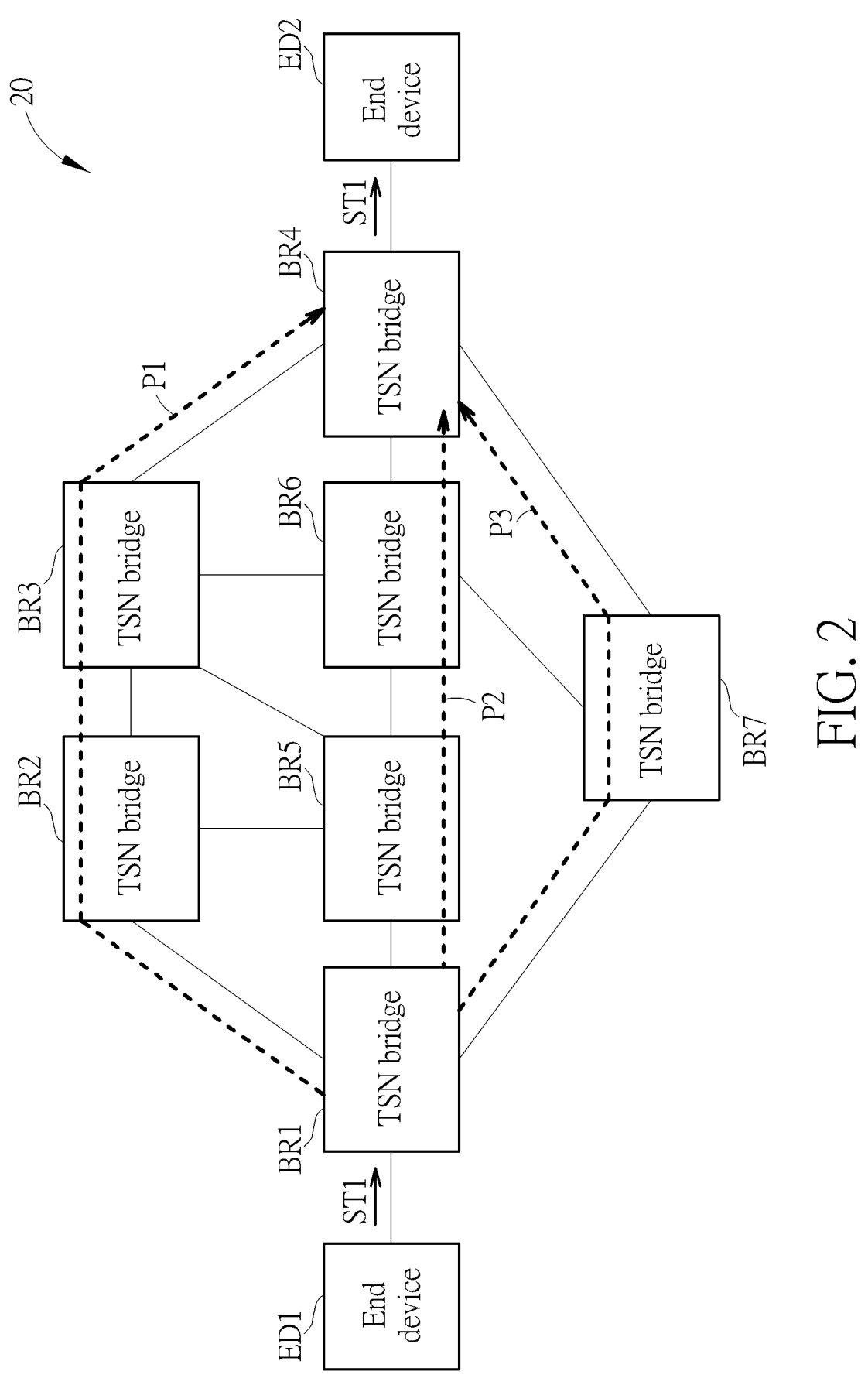
FIG. 2 is a schematic diagram of a network topology according to an embodiment of the present invention.

Please refer to FIG. 2, which is a schematic diagram of a network topology 20 according to an embodiment of the present invention. The network topology 20 comprises two end devices ED1-ED2 and seven TSN bridges BR1-BR7 connected by physical links, where the physical links have corresponding bandwidth capacities respectively. In addition, the network topology 20 may be modeled as a directed graph, the end devices ED1-ED2 and the TSN bridges BR1-BR7 may be modeled as vertices of the graph, and the physical links may be modeled as edges of the graph. It should be noted, FIG. 2 is intended to illustrate the concepts of the invention, and is not limited to the number of end devices, the number of TSN bridges, or the connection manner in practical applications.

As shown in FIG. 2, there may be multiple paths from the end device ED1 to the end device ED2, for example, a path {ED1, BR1, BR5, BR3, BR4, ED2} or a path {ED1, BR1, BR2, BR3, BR6, BR4, ED2}, etc., which may be used to transmit a stream STl from the source node ED1 to the destination node ED2. In an embodiment, a path P1 {ED1, BR1, BR2, BR3, BR4, ED2} and a path P2 {ED1, BR1, BR5, BR6, BR4, ED2} may be an edge-disjoint path pair for the survivable routing. Along the paths P1 and P2, all links are all disjoint (not overlapped) links except for the links {ED1, BR1} and {BR4, ED2} between the end devices ED1, ED2 and the TSN bridges BR1, BR4 that are connected to the end devices ED1 and ED2. The frame of the stream STl may be duplicated at the TSN bridge BR1 and transmitted simultaneously through different paths P1 and P2, and at the TSN bridge BR4, the frame arriving later is deleted. Accordingly, the redundant transmission mechanism of data streams in the time-sensitive networking is realized. Under this mechanism, transmission interruptions caused by a single network node or link failure may be avoided, improving the reliability of data transmission.

In FIG. 2, in addition to the path P1 and the path P2, the path P1 and a path P3 {ED1, BR1, BR7, BR4, ED2}, and the path P2 and the path p3 are also edge-disjoint path pairs that may be used for survivable routing. It should be noted, there are also several edge-disjoint path pairs, such as a path {ED1, BR1, BR5, BR3, BR4, ED2} and a path {ED1, BR1, BR7, BR6, BR4, ED2} (not labeled in the figure), and all are possible edge-disjoint path pairs for end-to-end survivable routing between the end device ED1 and the end device ED2. Therefore, in practical applications, when facing a larger-scale network topology and a larger number of data streams, there will be more possible edge-disjoint path pairs for the streams to transmit data. In this situation, the comprehensive planning of routing paths will be extremely complex and time-consuming.

In the embodiment of the present invention, the CNC server 100 determines the survivable routing paths and scheduling for each stream according to the plurality of parameters of the stream obtained by the CUC server 110, and configures the TSN bridges according to the determined routing paths and scheduling. In addition to determining routing paths for a first plurality of streams that need to be dynamically added to the TSN system 10, the CNC server 100 also considers routing paths for a plurality of background streams to maximize the number of streams that can be successfully scheduled. The method of determining routing path may be summarized into a process 30 as shown in FIG. 3. The process 30 comprises the following steps:

Step 300: Start.

Step 302: Receive a request for allocating a first plurality of streams.

Step 304: Determine a first plurality of candidate disjoint path pairs for each stream of the first plurality of streams according to a network topology of the TSN system.

Step 306: Initialize a plurality of final routing path pairs for the first plurality of streams and the plurality of background streams according to a first plurality of lengths of the first plurality of candidate disjoint path pairs.

Step 308: Select a plurality of temporary routing path pairs for the first plurality of streams and the plurality of background streams according to a first plurality of parameters.

Step 310: Update the first plurality of parameters according to the plurality of temporary routing path pairs.

Step 312: Compare the plurality of final routing path pairs and the plurality of temporary routing path pairs, and update the plurality of final routing path pairs with the plurality of temporary routing path pairs in response to the plurality of temporary routing path pairs being better than the plurality of final routing path pairs.

Step 314: Determine whether a timer has expired. If yes, proceed to Step 316; otherwise, proceed to Step 308.

Step 316: The TSN system transmits the first plurality of streams and the plurality of background streams according to the plurality of final routing path pairs.

Step 318: End.

According to the process 30, the CNC server 100 receives a request for allocating a first plurality of streams that need to be dynamically added to the TSN system 10 (Step 302), and then determines a first plurality of candidate disjoint path pairs for each stream of the first plurality of streams according to the network topology of the TSN system 10 (Step 304). The CNC server 100 initializes a plurality of final routing path pairs for the first plurality of streams and the plurality of background streams according to a first plurality of lengths of the first plurality of candidate disjoint path pairs (Step 306). Next, The CNC server 100 selects a plurality of temporary routing path pairs for the first plurality of streams and the plurality of background streams according to a first plurality of parameters (Step 308), and updates the first plurality of parameters according to the selected plurality of temporary routing path pairs (Step 310). The CNC server 100 compares the plurality of temporary routing path pairs with the plurality of final routing path pairs, and selects the better temporary routing path pairs therein to update the plurality of final routing path pairs (Step 312). Before a timer expires, the CNC server 100 repeats Step 308 to Step 312 to continuously search for better temporary routing path pairs to update the plurality of final routing path pairs (Step 314). Finally, after the timer expires, the TSN system 10 configures and transmits the first plurality of streams and the plurality of background streams according to the best plurality of final routing path pairs found at that time (Step 316). Accordingly, the TSN system 10 is capable of adding new streams dynamically and considering both the new-added streams as well as the background streams to efficiently determine routing paths, scheduling, and configuration for all the streams.

Specifically, in Step 302, the CNC server 100 receives the request for allocating the first plurality of streams. The embodiment of the present invention are exemplified in a fully centralized model of the TSN, where the CUC server 110 obtains requirements for allocating the streams from the end devices 120 and 122 and accordingly transmits the request for allocating the first plurality of streams to the CNC server 100, and is not limited thereto. For example, according to different model of the TSN, such as centralized network/distributed user model, the CNC server 100 may receive the request for allocating the first plurality of streams from the TSN bridges 130 and 132.

In Step 304, the CNC server 100 determines the first plurality of candidate disjoint path pairs for the each stream of the first plurality of streams according to the network topology of the TSN system 10. As mentioned above, in a larger-scale TSN system, each stream may have multiple edge-disjoint path pairs that may be used to transmit data. Therefore, instead of determining the routing paths according to all possible first plurality of disjoint path pairs for the each stream of the first plurality of streams, the embodiment of the present invention determines the first plurality of candidate disjoint path pairs from the first plurality of disjoint path pairs to reduce the complexity of determining the routing paths.

Specifically, the embodiment of the present invention may obtain the first plurality of disjoint path pairs for each of the first plurality of streams according to an efficient algorithms for listing k disjoint st-paths in graphs (by Grossi et al.). The Grossi's algorithm has the characteristics of unique and exhaustive, and thus the disjoint path pairs determined by the Grossi's algorithm are all applicable to the survivable routing. However, the algorithm may not ensure to obtain k disjoint path pairs of shortest path lengths. In the TSN system, transmitting with shorter path lengths may reduce scheduling conflicts and thus improve the overall schedulability of the network. Therefore, in the embodiment of the present invention, the deviation partitioning technique is used to make the Grossi's algorithm output k disjoint path pairs with the shortest path length as the candidate disjoint path pairs in ascending order according to the length of the disjoint path pairs. Accordingly, the CNC server 100 is able to determine the first plurality of candidate disjoint path pairs for the each stream of the first plurality of streams according to a plurality of lengths of the first plurality of disjoint path pairs for the each stream of the first plurality of streams. The disjoint path pair consists of two paths that the links thereof do not overlap at all, and the length of the disjoint path pair is the sum of the lengths of the two paths. In the embodiment, the length of the path is calculated using the number of hop counts of the path, but is not limited thereto.

According to the process 30, in Step 306, the CNC server 100 initializes the plurality of final routing path pairs for the first plurality of streams and the plurality of background streams according to a first plurality of lengths of the first plurality of candidate disjoint path pairs. As mentioned above, the network topology of the TSN system 10 may be modeled as a directed graph, and the process of determining routing paths for each stream according to the network topology is actually a solution process of calculating the best available paths on the directed graph. Accordingly, the plurality of final routing path pairs used for the first plurality of streams and the plurality of background streams in the embodiment of the present invention is the solution to the problem. In the embodiment of the present invention, the CNC server 100 selects the disjoint path pair with the shortest path length among the first plurality of candidate disjoint path pairs for the each stream of the first plurality of streams as the final routing path pair of each of the first plurality of streams among the plurality of final routing path pairs and selects the current disjoint path pair of each of the plurality of background streams for each of the plurality of background streams as the final routing path pair of each of the plurality of background streams among the plurality of final routing path pairs. Accordingly, the plurality of final routing path pairs are initialized. The current disjoint path pair of each stream of the plurality of background streams is the disjoint path pair for transmitting the each stream of the plurality of background streams selected from a second plurality of candidate disjoint path pairs for the each stream of the plurality of background streams according to the process 30 before the CNC server 100 receives the request for allocating the first plurality of streams.

In the embodiment, in addition to initializing the plurality of final routing path pairs, the CNC server 100 also needs to initialize a first plurality of parameters and a second plurality of parameters as well. The first plurality of parameters comprises a plurality of pheromone values of the plurality of background streams and the first plurality of streams for an ant colony optimization (ACO) algorithm. Specifically, the pheromone value of each of the second plurality of candidate disjoint path pairs for each stream of the plurality of the background streams may be a known value, while the pheromone value of each of the first plurality of candidate disjoint path pairs for each stream of the first plurality of streams may be initialized to 1, but is not limited thereto.

The second plurality of parameters comprise a plurality of visibility values of the plurality of background streams and the first plurality of streams for the ACO algorithm. Specifically, for an AVB stream, the visibility value of each disjoint path pair of the candidate disjoint path pairs corresponding to the stream may be a reciprocal of a worst-case delays of the disjoint path pair; for a TSN stream, the visibility value of each disjoint path pair of the candidate disjoint path pairs corresponding to the stream may be a reciprocal of an exponent of a length of the disjoint path pair. In addition, the visibility value of each current disjoint path pair of the plurality of background streams may be multiplied by a preference value. The preference value may be based on empirical evidence, and is used to increase the visibility values of the currently used disjoint path pair of each of the plurality of background streams, which increases the chance that the currently used disjoint path pairs will be selected again according to the ACO algorithm. Under this mechanism, the situation where the routing paths of the plurality of background streams are replaced may be reduced. In one embodiment, the preference value may be determined according to the cost of rerouting the plurality of background streams so as to adjust the probability of the routing paths of the plurality of background streams to be changed.

According to the process 30, in Step 308, the CNC server 100 selects the plurality of temporary routing path pairs for the first plurality of streams and the plurality of background streams according to the first plurality of parameters. In the embodiment of the present invention, to select the plurality of temporary routing path pairs is to select a disjoint path pair for each stream from the first plurality of candidate disjoint path pairs for each of the first plurality of streams and the second plurality of candidate disjoint path pairs of each of the plurality of background streams, where the disjoint path pair of each stream is selected according to a transition probability. The transition probability is determined according to the first plurality of parameters and the second plurality of parameters used for the plurality of background streams and the first plurality of streams. The transition probability may be calculated according to the following equation:

$$\text{Probability} = \frac{\psi[\lambda_k][z] \cdot \phi[\lambda_k][z]}{\sum_{\forall z \in \chi[\lambda_k]} \psi[\lambda_k][z] \cdot \phi[\lambda_k][z]} \tag{Eq. 1}$$

In Eq. 1, $\chi[\lambda_k]$ represents the plurality of candidate disjoint path pairs of the stream $\lambda_k$, $\psi[\lambda_k][z]$ represents the visibility value of the z-th candidate disjoint path pair of the stream $\lambda_k$, $\phi[\lambda_k][z]$ represents the pheromone value of the z-th candidate disjoint path pair of the stream $\lambda_k$, and Probability represents the transition probability of the z-th candidate disjoint path pair of the stream $\lambda_k$. The CNC server 100 may select the candidate disjoint path pair with the highest transition probability for each stream of the first plurality of streams and the plurality of background streams to be the plurality of temporary routing path pairs.

According to the process 30, in Step 310, the CNC server 100 updates the first plurality of parameters according to the plurality of temporary routing path pairs, where the plurality of pheromone values are updated according an evaporation coefficient for the ACO algorithm. The evaporation coefficient is a predetermined value, which may be between 0 and 1, and is used in each iteration of the ACO algorithm to reduce the pheromone values of all the candidate disjoint path pairs of each stream of the plurality of background streams and the first plurality of streams. The updated pheromone value of the z-th candidate disjoint path pair of the stream $\lambda_k$ may be $\rho \cdot \phi[\lambda_k][z]$, wherein $\rho$ is the evaporation coefficient. In addition, the pheromone values corresponding to the plurality of temporary routing path pairs should additionally be increased according to a predetermined value such as $$\phi[\lambda_k][z] + \frac{1}{\text{cost}},$$

where cost is an incremental parameter.

Next, in Step 312, the CNC server 100 compares the plurality of final routing path pairs and the plurality of temporary routing path pairs, and updates the plurality of final routing path pairs with the plurality of temporary routing path pairs in response to the plurality of temporary routing path pairs being better than the plurality of final routing path pairs. The comparison of the plurality of final routing path pairs and the plurality of temporary routing path pairs is based on an objective function, and the plurality of temporary routing path pairs being better than the plurality of final routing path pairs is a value of the objective function for the plurality of temporary routing path pairs being smaller than a value of the objective function for the plurality of final routing path pairs.

Specifically, the objective function of the embodiment of the present invention may be represented as follows:

$$\text{Objective}(\ ) = W_1 O_1 + W_2 O_2 + W_3 O_3 + W_4 O_4 \qquad \text{(Eq. 2)}$$

In Eq. 2, Objective( ) represents the objective function. $O_1$, $O_2$, $O_3$ and $O_4$ represent a number of non-schedulable TSN streams, a number of non-schedulable AVB streams, a number of the plurality of background streams to be rerouted, and a summation of delays of all AVB streams, respectively, and are not limited thereto. It should be noted, the schedulability of a stream is determined according to the worst-case delay of the stream and the deadline $D_k$ of the stream. If the worst-case delay of a stream is not greater than the deadline $D_k$, the stream is a schedulable stream. If the worst-case delay of a stream is greater than the deadline $D_k$, the stream is a non-schedulable stream. Moreover, $W_1$, $W_2$, $W_3$ and $W_4$ represent weight values corresponding to $O_1$, $O_2$, $O_3$ and $O_4$ and satisfy the following equation:

$$\begin{cases} W_1 > |\mathbb{S}_{\text{AVB}} \cup \mathbb{S}'_{\text{AVB}}| \cdot W_2, & \text{(Eq. 3)} \\ W_2 > |\mathbb{S}'| \cdot W_3, \\ W_3 > |\Sigma_{\lambda_k \in \mathbb{S}_{\text{AVB}}} D_k + \Sigma_{\lambda_k \in \mathbb{S}'_{\text{AVB}}} D_k|, \\ W_4 = 1. \end{cases}$$

In Eq. 3, $\mathbb{S}_{\text{AVB}}$ represents the set of all AVB streams in the first plurality of streams, $\mathbb{S}'_{\text{AVB}}$ represents the set of all AVB streams in the plurality of background streams, and $\mathbb{S}'$ represents the set of the plurality of background streams.

The CNC server 100 calculates the values of the objective function of the plurality of temporary routing path pairs and the plurality of final routing path pairs according to the objective function defined in Eq. 2 and Eq. 3 respectively. When the value of the object function of the plurality of temporary routing path pairs is smaller than the value of the object function of the plurality of final routing path pairs, it means that the plurality of temporary routing path pairs are better than the plurality of final routing path pairs. Thus, the plurality of final routing path pairs should be updated with the plurality of temporary routing path pairs.

According to the process 30, in Step 314, the CNC server 100 determines whether to continue iteration according to whether a predefined timer is expired. Before the timer expires, the CNC server 100 continues to execute Step 308 to Step 312 to obtain a better plurality of final routing path pairs. After the timer expires, the TSN system 10 may configure the network according to the plurality of final routing path pairs in Step 316. Specifically, the CNC server 100 responds to the request for allocating the first plurality of streams sent by the CUC server 110 according to the routing paths and scheduling of the plurality of final routing path pairs, and the CUC server 110 then transmits the relevant network configurations to the end devices 120 and 122.

Accordingly, the TSN system 10 is capable of increasing new streams dynamically and may consider both new streams and background streams to determine routing paths, scheduling, and configuration for all streams in a limited time.

Figure 4:
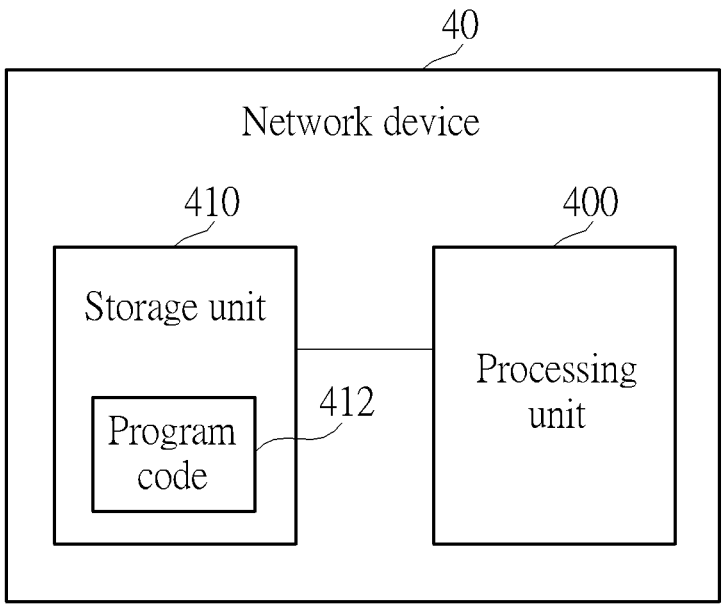
FIG. 4 is a schematic diagram of a network device according to an embodiment of the present invention.

Furthermore, please refer to FIG. 4, which is a schematic diagram of a network device 40 according to an embodiment of the present invention. The network device 40 may be used to implement the CNC server 100 of the embodiment of the present invention. As shown in FIG. 4, the network device 40 may comprise a processing unit 400 and a storage unit 410. The processing unit 400 may be a general-purpose processor, a microprocessor, an application-specific integrated circuit (ASIC), or the combination thereof. The storage unit 410 is coupled to the processing unit 410 and may be any type of data storage devices for storing a program code 412, and the program code 412 is read and executed by the processing unit 400. For example, the storage unit 410 may be a read-only memory (ROM), a flash memory, a random-access memory (RAM), a hard disk, an optical data storage device, a non-volatile storage unit, etc., and is not limited thereto.

The network device 40 is used to represent the necessary components required to implement the embodiments of the present invention, and those skilled in the art may make various modifications and adjustments accordingly, and is not limited to this. For example, when the network device 40 is applied to implement the CNC server 100, the process 30 for the method of determining routing path may be complied into the program code 412, stored in the storage unit 410, and executed by the processing unit 400. Moreover, the storage unit 410 is also used for storing the data required for running the method of determining routing path, and is not limited thereto.

In summary, the present invention provides a method and a device for determining routing paths, which simultaneously consider data streams with various traffic types and perform survivable routing path planning in a limited time in an online state, so as to solve the problem in the art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A network device for a Time-Sensitive Networking (TSN) system, wherein the TSN system comprises a plurality of background streams, the network device comprising:

a processing unit, configured to execute a program code; and a storage unit, coupled to the processing unit, configured to store the program code to instruct the processing unit to execute a method of determining routing path, wherein the method of determining routing path comprises the following steps in sequence:

(a) receiving a request for allocating a first plurality of streams;

(b) determining a first plurality of candidate disjoint path pairs for each stream of the first plurality of streams according to a network topology of the TSN system;

(c) initializing a plurality of final routing path pairs for the first plurality of streams and the plurality of background streams according to a first plurality of lengths of the first plurality of candidate disjoint path pairs;

(d) selecting a plurality of temporary routing path pairs for the first plurality of streams and the plurality of background streams according to a first plurality of parameters;

(e) updating the first plurality of parameters according to the plurality of temporary routing path pairs; and (f) comparing the plurality of final routing path pairs and the plurality of temporary routing path pairs, and updating the plurality of final routing path pairs with the plurality of temporary routing path pairs in response to the plurality of temporary routing path pairs being better than the plurality of final routing path pairs;

wherein the TSN system transmits the first plurality of streams and the plurality of background streams according to the plurality of final routing path pairs.

2. The network device of claim 1, wherein the method of determining routing path further comprises:

returning to the step (d) after executing the step (f) before a timer expires.

3. The network device of claim 1, wherein the step (b) of the method of determining routing path comprises:

obtaining a first plurality of disjoint path pairs for the each stream of the first plurality of streams according to efficient algorithms for listing k disjoint st-paths in graphs by Grossi;

determining the first plurality of candidate disjoint path pairs for the each stream of the first plurality of streams according to a plurality of lengths of the first plurality of disjoint path pairs for the each stream of the first plurality of streams.

4. The network device of claim 3, wherein a length of each disjoint path pair among the plurality of lengths of the first plurality of disjoint path pairs for the each stream of the first plurality of streams is a sum of a path length of each path of the each disjoint path pair.

5. The network device of claim 4, wherein the each path length of the path length of the each path is a number of hop counts of the each path.

6. The network device of claim 1, wherein the method of determining routing path further comprises:

selecting a current disjoint path pair for transmitting each stream of the plurality of background streams from a second plurality of candidate disjoint path pairs for each stream of the plurality of the background streams before receiving the request.

7. The network device of claim 6, wherein the step (c) of the method of determining routing path is initializing the plurality of final routing path pairs according to the first plurality of lengths of the first plurality of candidate disjoint path pairs for the each stream of the first plurality of streams and the current disjoint path pair for the each stream of the plurality of background streams.

8. The network device of claim 6, wherein the step (d) of the method of determining routing path is selecting the plurality of temporary routing path pairs from the first plurality of candidate disjoint path pairs for the each stream of the first plurality of streams and the second plurality of candidate disjoint path pairs for the each stream of the plurality of the background streams.

9. The network device of claim 1, wherein the first plurality of parameters of the method of determining routing path comprise a plurality of pheromone values of the plurality of background streams and the first plurality of streams for an ant colony optimization (ACO) algorithm.

10. The network device of claim 9, wherein the step (d) of the method of determining routing path is selecting the plurality of temporary routing path pairs according to a transition probability, wherein the transition probability is determined according to the first plurality of parameters and a second plurality of parameters of the plurality of background streams and the first plurality of streams.

11. The network device of claim 10, wherein the second plurality of parameters comprise a plurality of visibility values of the plurality of background streams and the first plurality of streams for the ACO algorithm.

12. The network device of claim 11, wherein the plurality of visibility values are determined as follows:

a visibility value of a disjoint path pair for a TSN stream is determined by a reciprocal of an exponent of a length of the disjoint path pair;

a visibility value of a disjoint path pair for an audio video bridging (AVB) stream is determined by a reciprocal of a worst-case delays of the disjoint path pair; and a visibility value of each current disjoint path pair of the plurality of background streams increases according to a preference value.

13. The network device of claim 9, wherein the step (e) of the method of determining routing path is updating the plurality of pheromone values according to an evaporation coefficient for the ACO algorithm, and additionally increasing pheromone values corresponding to the plurality of temporary routing path pairs among the plurality of pheromone values.

14. The network device of claim 1, wherein the step (f) of the method of determining routing path is performing comparison according to an objective function, wherein the plurality of temporary routing path pairs being better than the plurality of final routing path pairs is a value of the objective function for the plurality of temporary routing path pairs being smaller than a value of the objective function for the plurality of final routing path pairs.

15. The network device of claim 14, wherein the objective function at least comprises one of the following parameters:

a number of non-schedulable TSN streams;

a number of non-schedulable AVB streams;

a number of the plurality of background streams to be rerouted; and a summation of delays of all AVB streams.

16. The network device of claim 1, wherein the method of determining routing path supports routing path determination for TSN streams and AVB streams.

17. The network device of claim 1, wherein the network device is a centralized network configuration (CNC) server in the TSN system.

18. The network device of claim 17, wherein the request of the method of determining routing path is received from a centralized user configuration (CUC) server in the TSN system.

19. The network device of claim 17, wherein the step of the TSN system transmitting the first plurality of streams and the plurality of background streams according to the plurality of final routing path pairs further comprises:

the CNC server configuring a plurality of TSN bridges connected to the CNC server according to the plurality of final routing path pairs, wherein the plurality of TSN bridges are passed by the plurality of final routing path pairs.

20. A method of determining routing path for a Time-Sensitive Networking (TSN) system, wherein the TSN system comprises a plurality of background streams, the method comprising:

(a) receiving a request for allocating a first plurality of streams;

(b) determining a first plurality of candidate disjoint path pairs for each stream of the first plurality of streams according to a network topology of the TSN system;

(c) initializing a plurality of final routing path pairs for the first plurality of streams and the plurality of background streams according to a first plurality of lengths of the first plurality of candidate disjoint path pairs;

(d) selecting a plurality of temporary routing path pairs for the first plurality of streams and the plurality of background streams according to a first plurality of parameters;

(e) updating the first plurality of parameters according to the plurality of temporary routing path pairs; and (f) comparing the plurality of final routing path pairs and the plurality of temporary routing path pairs, and updating the plurality of final routing path pairs with the plurality of temporary routing path pairs in response to the plurality of temporary routing path pairs being better than the plurality of final routing path pairs;

wherein the TSN system transmits the first plurality of streams and the plurality of background streams according to the plurality of final routing path pairs.

21. The method of determining routing path of claim 20, further comprising:

returning to the step (d) after executing the step (f) before a timer expires.

22. The method of determining routing path of claim 20, wherein the step (b) comprises:

obtaining a first plurality of disjoint path pairs for the each stream of the first plurality of streams according to efficient algorithms for listing k disjoint st-paths in graphs by Grossi;

determining the first plurality of candidate disjoint path pairs for the each stream of the first plurality of streams according to a plurality of lengths of the first plurality of disjoint path pairs for the each stream of the first plurality of streams.

23. The method of determining routing path of claim 22, wherein a length of each disjoint path pair among the plurality of lengths of the first plurality of disjoint path pairs for the each stream of the first plurality of streams is a sum of a path length of each path of the each disjoint path pair.

24. The method of determining routing path of claim 23, wherein the each path length of the path length of the each path is a number of hop counts of the each path.

25. The method of determining routing path of claim 20, further comprising:

selecting a current disjoint path pair for transmitting each stream of the plurality of background streams from a second plurality of candidate disjoint path pairs for each stream of the plurality of the background streams before receiving the request.

26. The method of determining routing path of claim 25, wherein the step (c) is initializing the plurality of final routing path pairs according to the first plurality of lengths of the first plurality of candidate disjoint path pairs for the each stream of the first plurality of streams and the current disjoint path pair for the each stream of the plurality of background streams.

27. The method of determining routing path of claim 25, wherein the step (d) is selecting the plurality of temporary routing path pairs from the first plurality of candidate disjoint path pairs for the each stream of the first plurality of streams and the second plurality of candidate disjoint path pairs for the each stream of the plurality of the background streams.

28. The method of determining routing path of claim 20, wherein the first plurality of parameters comprise a plurality of pheromone values of the plurality of background streams and the first plurality of streams for an ant colony optimization (ACO) algorithm.

29. The method of determining routing path of claim 28, wherein the step (d) is selecting the plurality of temporary routing path pairs according to a transition probability, wherein the transition probability is determined according to the first plurality of parameters and a second plurality of parameters of the plurality of background streams and the first plurality of streams.

30. The method of determining routing path of claim 29, wherein the second plurality of parameters comprise a plurality of visibility values of the plurality of background streams and the first plurality of streams for the ACO algorithm.

31. The method of determining routing path of claim 30, wherein the plurality of visibility values are determined as follows:

a visibility value of a disjoint path pair for a TSN stream is determined by a reciprocal of an exponent of a length of the disjoint path pair;

a visibility value of a disjoint path pair for an audio video bridging (AVB) stream is determined by a reciprocal of a worst-case delays of the disjoint path pair; and a visibility value of each current disjoint path pair of the plurality of background streams increases according to a preference value.

32. The method of determining routing path of claim 28, wherein the step (e) is updating the plurality of pheromone values according to an evaporation coefficient for the ACO algorithm, and additionally increasing pheromone values corresponding to the plurality of temporary routing path pairs among the plurality of pheromone values.

33. The method of determining routing path of claim 20, wherein the step (f) is performing comparison according to an objective function, wherein the plurality of temporary routing path pairs being better than the plurality of final routing path pairs is a value of the objective function for the plurality of temporary routing path pairs being smaller than a value of the objective function for the plurality of final routing path pairs.

34. The method of determining routing path of claim 33, wherein the objective function at least comprises one of the following parameters:

a number of non-schedulable TSN streams;

a number of non-schedulable AVB streams;

a number of the plurality of background streams to be rerouted; and a summation of delays of all AVB streams.

35. The method of determining routing path of claim 20, supporting routing path determination for TSN streams and AVB streams.

\* \* \* \* \*